Figures 10, 11:
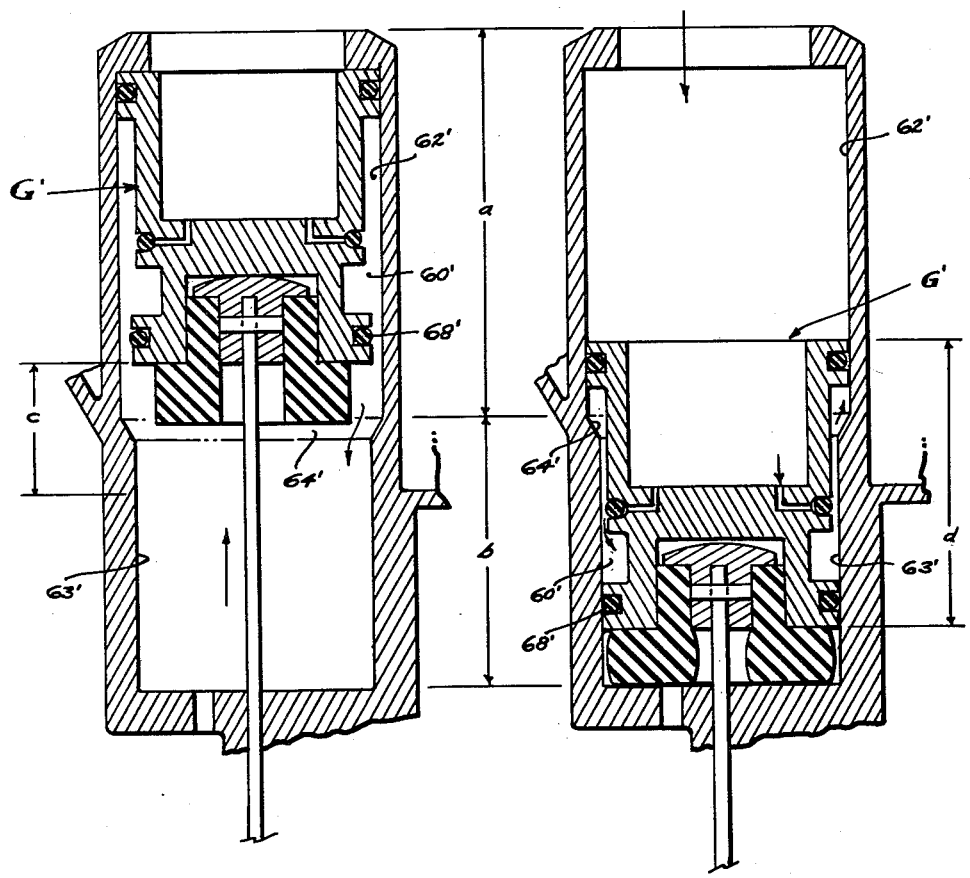

Dec. 8, 1964    R. E. POWERS    3,160,075
CYLINDER AND SELF RETURN PISTON WITH LUBRICATION MEANS
Filed June 22, 1962    3 Sheets-Sheet 1
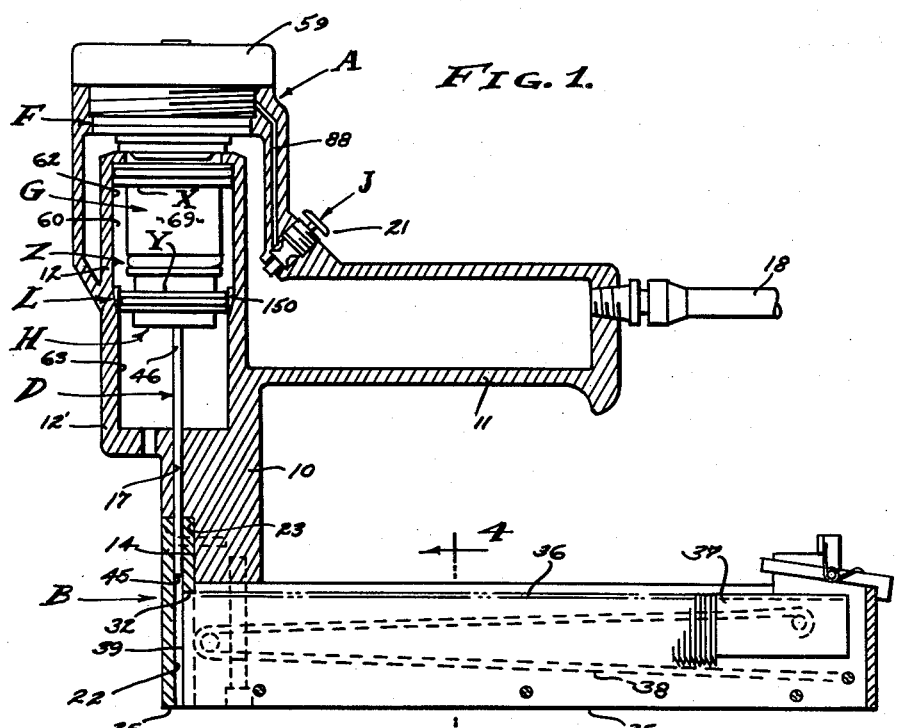
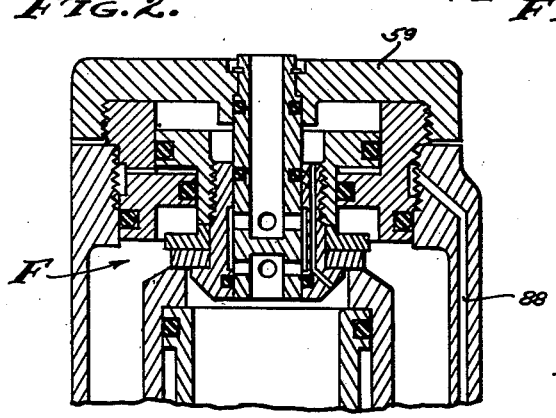
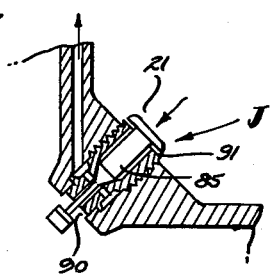
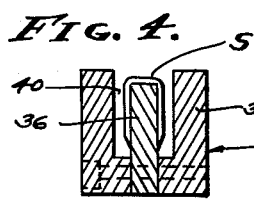
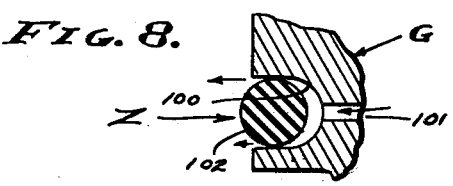
INVENTOR.
RICHARD E. POWERS
BY
W. H. Maxwell
AGENT Dec. 8, 1964    R. E. POWERS    3,160,075
CYLINDER AND SELF RETURN PISTON WITH LUBRICATION MEANS
Filed June 22, 1962    3 Sheets-Sheet 2
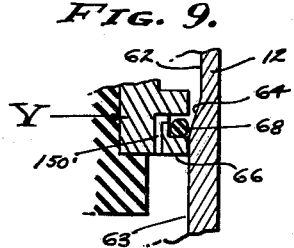
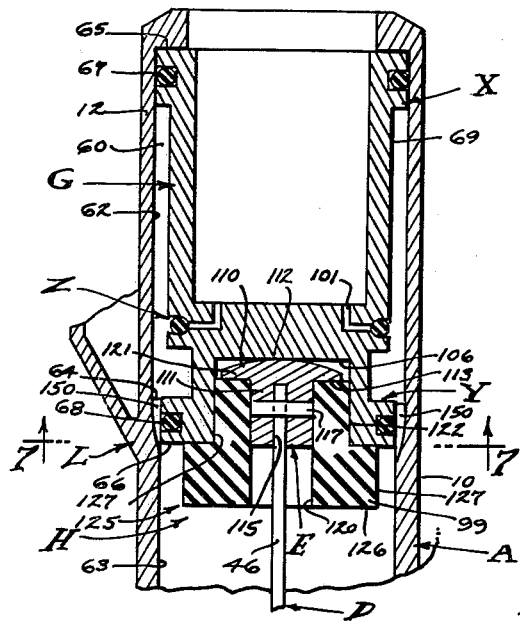
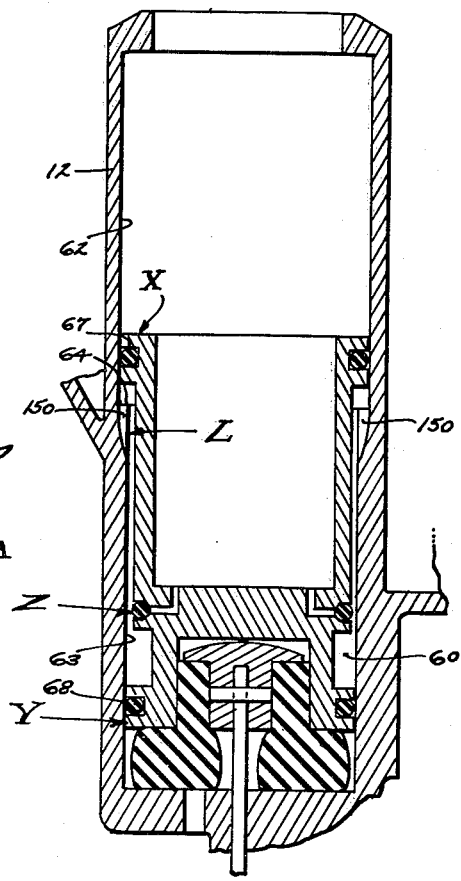
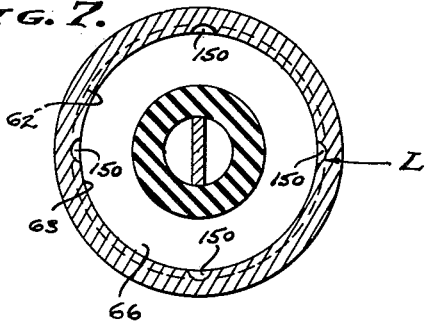
INVENTOR.
RICHARD E. POWERS
BY
Wm H. Maxwell
AGENT Dec. 8, 1964  R. E. POWERS  3,160,075
CYLINDER AND SELF RETURN PISTON WITH LUBRICATION MEANS
Filed June 22, 1962  3 Sheets-Sheet 3

INVENTOR.
RICHARD E. POWERS
BY
AGENT

20
United States Patent Office 3,160,075
Patented Dec. 8, 1964

3,160,075
CYLINDER AND SELF RETURN PISTON WITH LUBRICATION MEANS
Richard E. Powers, Monterey Park, Calif., assignor to Powers Wire Products Company, Inc., Monterey Park, Calif., a corporation of California
Filed June 22, 1962, Ser. No. 204,487
10 Claims. (Cl. 91—402)

This invention relates to a cylinder and piston motor and in particular with pneumatic motors having a self returning piston that is biased by entrapped air. More specifically, this invention is concerned with the unrestricted acceleration of and which the lubrication of a differential piston having axially spaced upper and lower piston portions differing in diameter and between which compressed air is entrapped. Further, this invention is concerned with the reduction in length of a differential motor of the type under consideration. In some instances said air is entrapped and in other instances said air is simply contained between said spaced piston portions. In any case, in ordinary tools the said entrapped or contained air (1) establishes a bias that resists acceleration, (2) it does not circulate and becomes stale and (3) the cylinder and piston device is of full double length.

Pneumatic motors of the type under consideration have utility in the operation of hand tools such as, for example, fastener driving tools. Following common practice, the fluid air used to drive said motors is supplied with lubricant, an oil mist that is carried by the air to the working parts of the said motor. Heretofore, lubrication has been satisfactory, for example, in spring returned piston devices because of the rather complete recharging with new air and oil mixture for every cycle of operation. However, in the case of pistons returned by entrapped air or contained air a lubrication problem arises, namely stagnation or drying up of the entrapped or contained air between the spaced piston portions. As a result, and in actual practice, the piston portion remote from the piston portion having repeated contact with the driving air becomes dry. A corresponding dryness occurs along the cylinder wall engaged by the said remote piston portion. Ultimately, this lack of supply with freshly misted air results in disintegration of the said remote piston portion, disintegration of the surrounding cylinder wall and disintegration of the seals employed therebetween, all to the end that premature breakdown occurs.

A general object of this invention is to provide for maximum initial acceleration of a piston in a cylinder by removal of return biasing therefrom for a substantial length of the acceleration.

It is an object of this invention to provide for repeated and continued lubrication of the entire piston, in a cylinder and piston motor having a self return piston of the character above referred to.

An object of this invention is to provide lubrication means in a cylinder and piston motor repeatedly operated by a mist lubricated air-oil mixture, whereby said mist or mixture is not entrapped nor contained to become stagnated or dry.

Another object of this invention is to provide lubrication means for the purpose and character above referred to that requires no addition of parts and simply a reforming of one or both of the parts (piston and cylinder) as they have been heretofore provided. Preferably, it is the cylinder alone which is modified and reformed to have the lubrication means as hereinafter disclosed.

Specifically, it is an object of this invention to provide for the bleeding of air and oil mist from any chamber associated with the piston and/or cylinder, which otherwise would entrap or contain the air and oil mist and permit it to become stagnated and dried out. In the particular case illustrated herein it is a chamber formed by the piston that is ventilated, so that a new and fresh charge of air is admitted to the said chamber during each cycle of operation of the motor.

It is another object of this invention to reduce the overall length of a differentially biased motor of the cylinder and piston type, and to also reduce the weight of moving parts thereby. As hereinafter described, there is a return bias that is removed during the return stroke of the piston, and inertia is relied upon for the completion of said return stroke. As a result, the effectiveness of the return function can be reduced, by shortening one of the cylinder bores, and to the end that the piston can also be shortened and simultaineously lightened.

The various objects and features of my invention will be fully understood from the following detailed description of a typical preferred form and application of my invention, throughout which description reference is made to the accompanying drawings in which:

FIG. 1 is a side sectional view of a typical fastener driving tool incorporating the lubricating construction of the present invention. FIG. 2 is an enlarged detailed sectional view of a portion of the structure shown in FIG. 1. FIG. 3 is an enlarged detailed view of a portion of FIG. 1 and showing the parts in a different operational position. FIG. 4 is a sectional view taken as indicated by line 4—4 on FIG. 1. FIGS. 5 and 6 are enlarged detailed sectional views of a portion of the structure, FIG. 5 showing the moving parts in an up position and FIG. 6 showing the parts in a down position. FIG. 7 is a sectional view taken through the piston and as indicated by line 7—7 on FIG. 5. FIG. 8 is an enlarged detailed view of a portion of the piston and taken as indicated by line 8—8 on FIG. 7. FIG. 9 is an enlarged fragmentary view showing a modified second form of this invention. FIGS. 10 and 11 are views similar to FIGS. 5 and 6 respectively and showing a third form, or feature, of this invention, namely a shortened construction.

The lubricating means of the present invention is shown incorporated in a pneumatic or air operated tool or fastener driving device. The drive piston for fluid operated motors may be used in connection with a stapling gun and, therefore, in the drawings I have illustrated this type of tool. It is to be understood, however, that the present invention is not limited to this particular kind of tool and may be employed in connection with any motor having a cylinder and piston driving means and particularly with those having spaced differentially sized piston portions.

The tool, as illustrated in the drawings, is adapted to be handled manually and involves, generally, a frame A having a body portion 10 and a handle or grip portion 11, a head B carried by the frame A and adapted to direct fasteners into a piece of work, a magazine C for handling a supply of fasteners such as staples are received and handled by the head, a driver blade D, a latching means F adapted to cooperate with the control operation of the driver blade D, a piston G having differentially formed portions X and Y operable in a cylinder 12 in the frame A and adapted to drive the blade D a coupler H operatively joining the driver blade D and piston G, fluid pressure handling means Z carried by the piston G, and valve means J adapted to control the supply of fluid under pressure to actuate the piston G through a work stroke and to be handled by the means Z to effect a return stroke.

The frame A carries the various elements of the tool, and is shaped to be conveniently handled by a person. The frame A involves, generally, the body portion 10 and the handle or grip portion 11. The body portion 10 is a simple elongate part having a cylinder 12 extending longitudinally thereof and having an opening or passage 17 extending longitudinally through the head thereof at the lower end of the cylinder 12, and has a recess 14 at the opening 17 for receiving and positioning the head B.

The handle or grip portion 11 is provided to give the person handling the tool a convenient means to hold the tool and is a simple grip of ordinary construction that projects from the body 10. In practice, the grip 11 may be substantially normal to the axis of the body and may project therefrom as clearly shown in FIG. 1 of the drawings.

In structures of the type under consideration, it is common practice to provide a fluid and lubricant mist pressure supply connection 18 at the grip 11, such as a pneumatic hose or the like, and also to include a control means at the grip 11. It is to be understood that any suitable fluid pressure and oil mist supply can be provided without affecting the present invention. In the case illustrated the hose of the power connection 18 is attached to the grip 11 through a quick disconnect and the valve means J is under control of a finger operated trigger 21.

The head B is, in effect, an extension of the body 10 of the frame A and is provided to receive and deliver fasteners such as staples to the work being acted upon by the tool. The head B is carried by the body in the recess 14 and is provided with a longitudinal guideway 22 that extends through and opens at the ends of the head B. The head B has a bottom face 23 engaged with the recess 14 and it has a front end face 25 engageable with the work.

In the particular form of the invention shown, the guideway 22 is adapted to handle fasteners or staples S that are U-shaped and formed of wire, or the like, having a pair of sharpened ends (see FIG. 4). The staples referred to are substantially elongate with straight parallel shanks joined by a curved back. It will be apparent how the guideway 22 can be proportioned so that it will readily pass the staples with clearance and will act upon the staples to guide them as they are delivered through the head B and from the tool. The guideway 22 is a continuation of the passage 17 above described and guides the driver blade D of the tool as well as the staples S that are handled thereby.

A fastener or staple receiving opening 32 extends laterally through the head B, which opening enters the bottom face 23 of the head and opens into the passage 22 so that the staples S fed to the head B are properly guided and aligned with the passage 22 before they are engaged by the driver blade D of the mechanism.

The magazine C is adapted to handle a supply or stack of fasteners or U-shaped staples S and involves, generally, a case 35 carried by the frame A, a guide 36 within the case 35, a follower 37 adapted to advance the fasteners or staples, and a feed spring 38 yieldingly urging the follower toward the head B. The case 35 is carried by the body 10 and is an elongate part that projects laterally therefrom. The case is shell like in form and the guide 36 is a core-like part that is co-extensive with the case 35 and is carried between the side walls thereof. As shown in FIG. 4 of the drawings, the case 35 and guide 36 are shaped so that a longitudinal passage 40 is formed, which passage conforms in general configuration to the U-shaped staples S which are handled by the head.

The guide 36 enters the fastener or staple receiving opening 32 and terminates in a flat end 39 that occurs in the plane of the bottom wall of the guideway 22. The follower 37 conforms with the configuration of and is slidably carried in the passage 40 and is yieldingly urged toward the head B by the feed spring 38. Means is provided to prevent the follower 37 from entering the guideway 22. The fasteners or staples S are inserted into the magazine C through the open top thereof by simply engaging them over the guide 36 ahead of the follower 37 tensioning the spring 38. As clearly shown in FIG. 1, a spring biased latch 30 secures the follower 37 in a retracted position when desired, thus facilitating insertion of the fasteners.

The driver blade D is essentially a slender elongate part rectangular in cross sectional configuration and terminates at its forward end in a flat fastener or staple driving face 45. The blade D has a lower staple driving portion at the forward end thereof which occupies the guideway 22 of the head B, and the blade D has an upper driven portion 46 at the rear end thereof which couples to a head E to have driving engagement with the piston G.

The release means F that may be employed is disclosed in Patent No. 3,026,849 entitled Fluid Operated Valve for Release of Fluid Under Pressure, issued March 27, 1962, and is adapted to cooperate with and control operation of the piston G, later described. The means F is provided to position the piston G at the upper end of the cylinder 12 and to move and accelerate the piston G when sufficient fluid pressure has been established to effect the desired work stroke. The release means F may involve various and suitable mechanism to carry out the function referred to without affecting the present invention. For example, the release means F may involve means adapted to shift a valve element between two positions, one where the supply of air is shut off from the cylinder 12 and air exhausted therefrom, and the other where the supply of air is admitted to the cylinder 12 and the exhaust is closed. The frame A is chambered in order to provide a reservoir for the accumulation of a volume of air under pressure, and the top end of the cylinder 12 opens into said chamber to be opened and closed by the valve element of means F. The upper end of said chamber remote from the head B is closed by a cap 59, the latching means F being carried by and operable through the cap.

The piston G operates in the cylinder 12 and has driving engagement with the driver blade D. The piston G is adapted to drive or move the driver blade D forwardly or downwardly and is adapted to be damped or snubbed separately from the driver blade D. The cylinder 12 is incorporated in the body 10 of the frame A on the longitudinal axis thereof, and is supplied with fluid under pressure by the valve means J, as hereinafter described. The piston G is freely carried in the cylinder 12 and is actuated to retract and to advance in the cylinder. In the particular tool illustrated throughout the drawings the ordinary compression return spring is eliminated which is usually provided within the cylinder 12 ahead of the piston G to return the piston to a retracted position. The tool illustrated is operated entirely by fluid pressure so that when the trigger 21 of the tool is operated the piston G is moved to the bottom of the cylinder 12, and so that when the trigger 21 is released the piston G is moved to the top of the cylinder 12. The trigger 21 controls the valve means J later described.

The piston G is light in weight, preferably of magnesium, or the like, to provide minimum inertia therein and is characterized by upper and lower portions X and Y of different diameter establishing a chamber 60 therebetween. The piston G occupies the interior of the cylinder 12 in which case the cylinder 12 is also characterized by upper and lower bores 62 and 63 of different diameters. The return means involves the provision of said differing diameters in connection with the cylinder 12 and piston B, and further involves the provision of a pressure supply means Z in communication with the cylinder 12 between the portions X and Y of the piston G. As illustrated, the lower bore 63 is somewhat smaller in diameter than the upper bore 62. Thus, there is a differential between the effective diameters of the two bores 62 and 63 establishing an upwardly facing shoulder 64.

The piston G is a shell-like body of material, for example light weight material as above specified, and has upper and lower piston heads 65 and 66 at the upper and lower portions X and Y respectively. The head 65 is slidably operable in the bore 62 of the cylinder 12 while the head 66 is slidably operable in the bore 63 of the cylinder 12. As shown, suitable sealing rings 67 and 68 are provided at the two heads 65 and 66, and are preferably O ring type sealing rings carried in annular grooves provided in the peripheries of the heads, respectively. As shown, a turned portion 69 extends between the heads 65 and 66, preferably of a diameter slightly smaller than the lower head 66.

The valve means J is a fluid pressure exhausting means that retains or exhausts operating fluid, air and oil mist, in the release means F. The valve means J is preferably formed in and carried by the frame A of the tool and, as shown, is a three way valve with a port 90 opening into the pressure chamber, a port 91 open to atmosphere, and a port 88 opening beneath the valve element of means F. A manually operable trigger 21 operates a valve 85 to open port 90 to port 88, whereby the valve element of means F is lifted. The said valve element of means F is normally closed, being vented to atmosphere through port 91.

The fluid pressure handling means Z that is incorporated in the piston G between the upper and lower portions X and Y thereof is a valve means that allows fluid to flow in one direction only and checks the flow of fluid in the other direction so that fluid pressure applied to the cylinder 12 above the piston G is directed to the chamber 60 and is contained or entrapped in the chamber 60 by action of the valve of the means Z. As shown, the means Z is incorporated in the construction of the piston G (see FIGS. 7 and 8) and involves a valve seat 100, a port 101 opening at the seat, and a valve element 102 engaged with the seat to close the port. The valve seat 100 is a circumferentially formed seat at the exterior of the piston G and formed in the intermediate cylindrical portion 69 of the piston between the portions X and Y. The port 101, or ports as shown, extends from the interior of the piston G in communication with the upper end thereof and opens at the seat 100. The valve element 102 is circular, preferably a band or the like, of elastic material, in the case illustrated, the valve element 102 is an elastic band of rubber that encircles the piston G and which is constricted onto the seat 100. As shown, the valve element 102 normally closes the port 101 so that external fluid pressure will not enter the piston G, but so that internal fluid pressure is free to pass into the chamber 60 to be entrapped. In practice the band forming the valve element 102 is circular in cross section and in the form of an O ring sealing ring, and in which case the seat 100 is arcuate in form to cooperate with the inner diameter of the element 102. It will be apparent how the O ring shaped valve element 102 entraps fluid under pressure in the chamber 60.

When fluid under pressure (air and oil mist) is applied to the upper end of the cylinder 12 the piston G moves downwardly and the chamber 60 is charged with fluid under pressure. Upon release of fluid from the upper end of the cylinder 12 the valve 102 of the means Z normally operates to retain fluid under pressure in the chamber 60. The fluid that is employed to operate the piston G is air an oil mist, or the like, which is elastic or compressible. The compressed fluid that is captured in the chamber 60 tends to expand and acts against the larger piston head 65 to move it upwardly to the position shown in FIG. 5.

The coupler H cooperates a head E at the upper end of the driver blade D and is characterized by a single body 99 of resilient or elastic material, preferably of rubber, or the like, that flexibly joins the piston G to the blade D and which engages the bottom 12' of the cylinder 12 to arrest the piston G and blade D.

The driving head E is rigidly coupled to the driver blade D and is free of the body of the piston G. The head E is formed of a light weight material, for example of aluminum or the like, to provide minimum inertia in the driver blade D. In practice, the head E is carried within a recess entering the piston G and is positioned and guided therein by the coupler H. The head E has driving engagement with the piston body through the bottom 106 and has clearance with the cylindrical wall 107 of the recess.

The head E is characterized by a radially projecting flange 110 and a center portion 111 that is coupled to the driver blade D. The flange 110 forms a disc-shaped element that has an upper face 112 convexly formed concentrically with the axis of the blade D. The center portion 111 is in the form of a depending extension substantially smaller in diameter than the flange 110 and has centering engagement with the coupler H.

The coupler H, of resilient or elastic material, retains the head E within the recess and centered with the piston G. Further, the coupler H holds the head E in working position to the bottom 106. The coupler H is characterized by means to arrest or damp the piston G and blade D independently of each other. That is, means is provided in the coupler H to individually damp the piston G and/or the blade, to the end that the piston alone can be damped, and to the end that the blade D can be damped, all as circumstances require.

With the tool and pneumatic motor therefore, as hereinabove disclosed there would ordinarily be a permanent entrapment of air and oil mist within the chamber 60. In actual practice, such tools have been on the shelf for several months and have retained a charge of compressed air within said chamber, a positive indication that there could be no circulation of fresh air and oil mist in said chamber during normal operations. Therefore, in accordance with the present invention, I have provided means L that ventilates the chamber 60 after each completed operation of the tool shown and described. With the tool, as described, a percussive work stroke is performed at the end of which there is a damping of the moving parts followed by a return stroke, affected by the entrapped and compressed air which is within the chamber 60. It is significant that the piston G and all of its connected and/or associated parts and elements rebound from the end of the work stroke and return toward the release means F with accelerated speed under influence of the self returning feature afforded by the compressed elastic fluid acting in the chamber 60. As a result, there is considerable inertia stored in the moving parts at or near the upper end of the return stroke (see FIG. 5) where the piston remains poised for the next work stroke.

The means L is a bleed means and involves one or more fluid passages 150 extending between the chamber 60 and the chamber beneath the lower piston portion Y when the piston G is at or in a rest or poised position, or the like. In accordance with the invention, the passage 150 is closed, or inoperative when the piston G is moved from the said rest or poised position. As a result of the function of the means L, fluid under pressure is exhausted from the chamber 60 each and every time the piston G is rested in its uppermost poised position. Therefore, a fresh oil mist laden charge of compressed fluid enters the chamber immediately following release of air by the means F and during the acceleration of the piston G and during the work stroke.

In the first and preferred form of the invention shown in FIGS. 1 through 8 the passage 150 is formed in the cylinder body at the shoulder 64, to open into the chamber 60 and to extend below and open into said lower chamber below the piston portion Y. It is preferred that there be a plurality of narrow slot-like channels, or grooves, extending longitudinally of the cylinder 12. The passage 150, as shown, is of a depth about equal to the radial extent of the shoulder 64 and opening into chamber 60 at said shoulder. The vertical or longitudinal extent of the passage 150 is such that it opens inwardly below the piston portion Y, only when the parts are positioned as in FIG. 5.

In the second form of the invention shown in FIG. 9 the passage 150' is formed in the piston body at the head or piston portion Y. In this form the passage 150' is drilled so as to open into chamber 60 through the groove that accommodates O ring 68, when the piston is raised, as in FIG. 5. And, the passage 105' opens downwardly into the chamber below the piston portion Y. The cylinder walls 62 and 63 are joined by an intermediate tapered portion which the O 68 passes. Thus, the said O ring is relaxed so as to open the passage 150'.

In both forms of the invention thus far described, movement of the piston causes closing of the passage 150, or 150', for the remainder of the work stroke. Inertia at the very end of the return stroke carries the piston into the poised position whereby the passage is opened to exhaust the chamber 60. Thus, it will be apparent that a fresh oil laden mixture is communicated to both cylinder bores 63 and 64, and that the lowermost O ring 68 is lubricated the same as the uppermost O ring 67. In practice, the passage 150 or 150' is a bleed passage affording but little flow of fluid, thereby creating leakage only. As a result, there is no hindrance to operation of the pneumatic motor and extremely little leakage, if any, at the beginning of the work stroke, to the end that there is adequate lubrication to the relatively sliding parts of the motor, and the tool is properly effective for an extended operative life.

From the foregoing it will be apparent that build-up of pressure in the chamber 60 does not occur until an intermediate position of the piston G, a position well advanced along the work stroke. Therefore, initial acceleration which is most critical is not biased, and it is not until the end of the work stroke that a proper and sufficient return bias is established.

In the third and most refined form of the present invention the cylinder bore 63' and piston G' are shortened axially, in comparison to the corresponding parts of the first two forms of the invention, and the passage 150 or 150' is unnecessary. The characteristic feature of this form of the invention is the complete retraction of the piston G' from the smaller cylinder bore 63', when the piston is raised as in FIG. 10 (same position as piston G in FIG. 5). As a result, there is a bleeding of air from, or a complete exhausting of air from, the chamber 60 and into the chamber below the piston. Friction of the uppermost O ring engaged with the cylinder wall inherently holds the piston poised, as shown in FIGS. 1, 2, 5 and 10.

In this third form of the invention, the cylinder walls 62' and 63' are joined by an intermediate tapered shoulder 64', as shown, in order to wedgedly engage the lowermost O ring 68', to constrict the said O ring for repositioning within the bore 63'. With the inertia stored in the moving piston during the termination of its return stroke, it is unnecessary to continue the application of said return bias afforded by the differential piston action. Therefore, the bore 63' is shorter axially than the bore 62', as clearly indicated by the comparable dimensions a and b in FIG. 10. Concurrently with the shortening of the bore 63' there is a more than or a corresponding shortening of the ordinary length of the piston G', which is not so apparent and which is unobvious. This shortening is indicated by the dimension c in FIG. 10. That is, the bore 63' is not only shortened but the piston G' is additionally shortened so that it is far shorter and retracts completely from the bore 63'. Thus, from FIGS. 10 and 11 of the drawings it will be seen that the cylinder (combined bores 62' and 63') is shortened to the extent that the bore 63' is sufficiently effective when relying upon inertia of the moving piston. The piston G' is correspondingly lightened to the extent that it can be retracted a substantial distance from the bore 63'. The amount of piston shortening will vary in different circumstances depending upon the inertia available in the piston and its associated parts. As shown, the length of the piston G' is reduced to the dimension d indicated in FIG. 11.

With the refinements of the third form of the invention, all three major objectives of the present invention are achieved. The bias is removed as desired. The lower O ring is lubricated the same as the upper O ring. And the entire device is shortened and made lighter in weight. As a matter of fact, there are other utilitarian features that inherently follow from the provision of the improvements hereinabove disclosed, as will be apparent to those skilled in the art.

Having described only a typical preferred form and application of my invention, I do not wish to be limited or restricted to the specific details herein set forth, but wish to reserve to myself any variation or modifications that may appear to those skilled in the art and fall within the scope of the following claims.

Having described my invention, I claim:

1. In a cylinder and piston motor of the character described:
   (a) differentially sized bores and one continuing from the other,
   (b) a piston having a head portion operable in each bore respectively and forming a chamber therebetween and with a cylinder chamber at the larger sized bore,
   (c) said piston being movable in said bores and with its smaller head portion retractable from the smaller of said bores,
   (d) means to charge and exhaust said cylinder chamber,
   (e) exhaust means in the smaller bore,
   (f) and valve means admitting fluid to flow from the cylinder chamber and into the chamber between said head portions of the piston, whereby the chamber between said portions is exhausted of fluid under pressure when the smaller head portion is retracted from the smaller bore and is rechargeable when the smaller head portion is re-entered into the smaller bore.

2. A cylinder and piston motor of the character described:
   (a) differentially sized bores and one continuing from the other,
   (b) a piston having a head portion operable in each bore respectively and forming a chamber therebetween and with a cylinder chamber at the larger sized bore,
   (c) said piston being movable in said bores and shortened with the smaller head portion retractable from the smaller one of said bores,
   (d) means to charge and exhaust said cylinder chamber,
   (e) exhaust means in the smaller bore,
   (f) and valve means admitting fluid to flow from the said cylinder chamber and into the chamber between said head portions of the piston, whereby the chamber between said head portions is exhausted of fluid under pressure when the smaller head portion is retracted from the smaller bore and is rechargeable when the smaller head portion is re-entered into the smaller bore.

3. In a cylinder and piston motor of the character described:
   (a) differentially sized bores and one continuing from the other,
   (b) a piston having a head portion operable in each bore respectively and each with a seal engageable in said respective bore and forming a chamber therebetween and with a cylinder chamber at the larger sized bore, (c) said piston being movable in said bores and with its smaller head portion and seal being retractable from the smaller of said bores, (d) means to charge and exhaust said cylinder chamber, (e) exhaust means in the smaller bore, (f) and valve means admitting fluid to flow from the said cylinder chamber and into the chamber between said head portions of the piston, whereby the chamber between said head portions is exhausted of fluid under pressure when the smaller head portion is retracted from the smaller bore and is rechargeable when the smaller head portion is re-entered into the smaller bore.

4. A cylinder and piston motor of the character described:

(a) differentially sized bores and one continuing from the other, (b) a piston having a head portion operable in each bore respectively, and each with a seal engageable in said respective bore and forming a chamber therebetween and with a cylinder chamber at the larger sized bore, (c) said piston being movable in said bores and shortened so that the smaller portion is retractable from the smaller one of said bores, (d) means to charge and exhaust said cylinder chamber, (e) exhaust means in the smaller bore, (f) and valve means admitting fluid to flow from the said cylinder chamber and into the chamber between said head portions of the piston, whereby the chamber between said head portions is exhausted of fluid under pressure when the smaller head portion is retracted from the smaller bore and is rechargeable when the smaller head portion is re-entered into the smaller bore.

5. In combination:

(a) a cylinder and piston motor having a cylinder with differentially sized bores, with a piston having a head portion operable in each bore respectively and forming a chamber therebetween and with an upper cylinder chamber at the larger sized bore, (b) means to charge and to exhaust said cylinder chamber, (c) exhaust means in the smaller bore, (d) a fluid passage opening above and below the smaller of said two head portions (e) and means closing said passage during downward movement of the piston, (f) and valve means admitting fluid to flow from said cylinder chamber and into the chamber between said head portions of the piston, whereby the chamber between said head portions is exhausted of fluid under pressure when said passage is open and with the smaller head portion retracted from the smaller bore and is rechargeable with fluid under pressure when the smaller head portion is re-entered into the smaller bore when said passage is closed.

6. In combination:

(a) a cylinder and piston motor having a cylinder with differentially sized bores, with a piston having a head portion operable in each bore respectively and forming a chamber therebetween and with an upper cylinder chamber at the larger sized bore, (b) means to charge and to exhaust said cylinder chamber, (c) exhaust means in the smaller bore, (d) a fluid passage in the cylinder and opening above and below the smaller of said two head portions, (e) and means closing said passage during downward movement of the piston, (f) and valve means admitting fluid to flow from said cylinder chamber and into the chamber between said head portions of the piston, whereby the chamber between said head portions is exhausted of fluid under pressure when said passage is open and with the smaller head portion retracted from the smaller bore and is rechargeable with fluid under pressure when the smaller head portion is re-entered into the smaller bore when said passage is closed.

7. In combination:

(a) a cylinder and piston motor having a cylinder with differentially sized bores, with a piston having a head portion operable in each bore respectively and forming a chamber therebetween and with an upper cylinder chamber at the larger sized bore, (b) means to charge and to exhaust said cylinder chamber, (c) exhaust means in the smaller bore, (d) a channel in one of the said cylinder bores and opening above and below the smaller of said two head portions, (e) said channel being closed to the chamber between the said piston portions upon downward movement of the piston, (f) and valve means admitting fluid to flow from said cylinder chamber and into the chamber between said head portions of the piston, whereby the chamber between said head portions is exhausted of fluid under pressure when said passage is open and with the smaller head portion retracted from the smaller bore and is rechargeable with fluid under pressure when the smaller head portion is re-entered into the smaller bore when said passage is closed.

8. In combination:

(a) a cylinder and piston motor having a cylinder with differentially sized bores, with a piston having a head portion operable in each bore respectively and forming a chamber therebetween and with an upper cylinder chamber at the larger sized bore, (b) means to charge and to exhaust said cylinder chamber, (c) exhaust means in the smaller bore, (d) a fluid passage in the piston and normally opening above and below the smaller of said two head portions, (e) means closing said passage during movement of the piston from a normal position, (f) and valve means admitting fluid to flow from said cylinder chamber and into the chamber between said head portions of the piston, whereby the chamber between said head portions exhausts fluid under pressure when the smaller head portion is retracted from the smaller bore and is rechargeable when the smaller head portion is re-entered into the smaller bore.

9. In combination:

(a) a cylinder and piston motor having a cylinder with differentially sized bores, with a piston having a head portion operable in each bore respectively and forming a chamber therebetween and with an upper cylinder chamber at the larger sized bore, (b) means to charge and to exhaust said cylinder chamber, (c) exhaust means in the smaller bore, (d) a fluid passage in the piston and opening above and below the smaller of said two head portions, (e) said passage being closed to the chamber between the said piston portions upon downward movement of the piston, (f) and valve means admitting fluid to flow from said cylinder chamber and into the chamber between said head portions of the piston, whereby the chamber between said head portions is exhausted of fluid under pressure when said passage is open and with the smaller head portion retracted from the smaller bore and is rechargeable with fluid under pressure when the smaller head portion is re-entered into the smaller bore when said passage is closed.

10. In combination:
(a) a cylinder and piston motor with differentially sized bores, with a piston having a head portion operable in each bore respectively and forming a chamber therebetween and with an upper cylinder chamber at the larger sized bore,
(b) means to charge and to exhaust said cylinder chamber,
(c) exhaust means in the smaller bore,
(d) said piston being retractable from the smaller of said bores,
(e) and valve means admitting fluid to flow from said cylinder chamber and into the chamber between said head portions of the piston, whereby the chamber between said head portions is exhausted of fluid under pressure when the smaller head portion is retracted from the smaller bore and is rechargeable when the smaller head portion is re-entered into the smaller bore.

References Cited in the file of this patent

UNITED STATES PATENTS

| | | |
|---|---|---|
| 2,463,537 | Hoor | Mar. 8, 1949 |
| 2,703,558 | Wilcox | Mar. 8, 1955 |
| 2,746,425 | Schafer | May 22, 1956 |
| 2,914,033 | Powers et al. | Nov. 24, 1959 |
| 2,959,155 | Powers et al. | Nov. 8, 1960 |
| 2,983,922 | Juilfs | May 16, 1961 |
| 3,040,709 | Wandel | June 26, 1962 |
| 3,084,672 | Dalton | Apr. 9, 1963 |